No. 738,756. PATENTED SEPT. 15, 1903.
F. G. BAUM.
COMPENSATOR.
APPLICATION FILED OCT. 17, 1902.

NO MODEL.

Witnesses

Inventor:—
FRANK G. BAUM.
By his Attorney

THE NORRIS PETERS CO., PHOTO-LITHO., WASHINGTON, D. C.

No. 738,756. Patented September 15, 1903.

UNITED STATES PATENT OFFICE.

FRANK GEORGE BAUM, OF PALOALTO, CALIFORNIA, ASSIGNOR TO STANLEY ELECTRIC MANUFACTURING COMPANY, OF PITTSFIELD, MASSACHUSETTS, A CORPORATION OF NEW JERSEY.

COMPENSATOR.

SPECIFICATION forming part of Letters Patent No. 738,756, dated September 15, 1903.

Application filed October 17, 1902. Serial No. 127,711. (No model.)

*To all whom it may concern:*

Be it known that I, FRANK GEORGE BAUM, a citizen of the United States, residing at Paloalto, county of Santa Clara, and State of California, have invented certain new and useful Improvements in Compensators, of which the following is a full, clear, and exact description.

My invention relates to improvements in alternating-current systems, and has for its object to provide an efficient means for compensating for the lag produced by variation in inductive loads.

The following is a description of my invention, reference being had to the accompanying drawings, in which—

Figure 1:
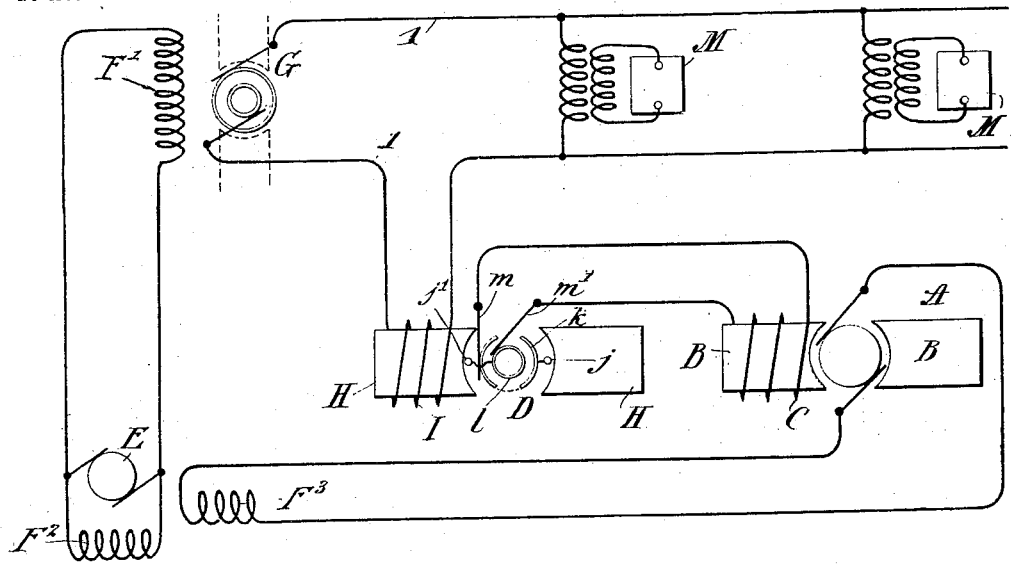
Figure 2:
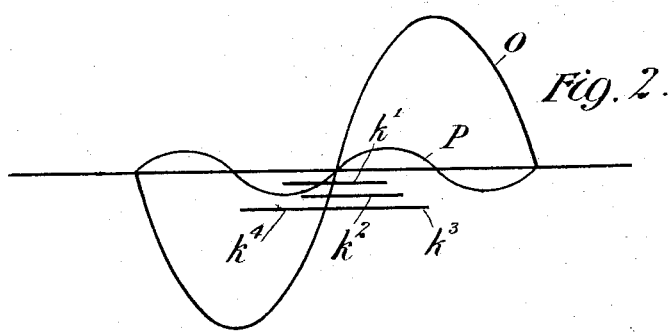
Figure 3:
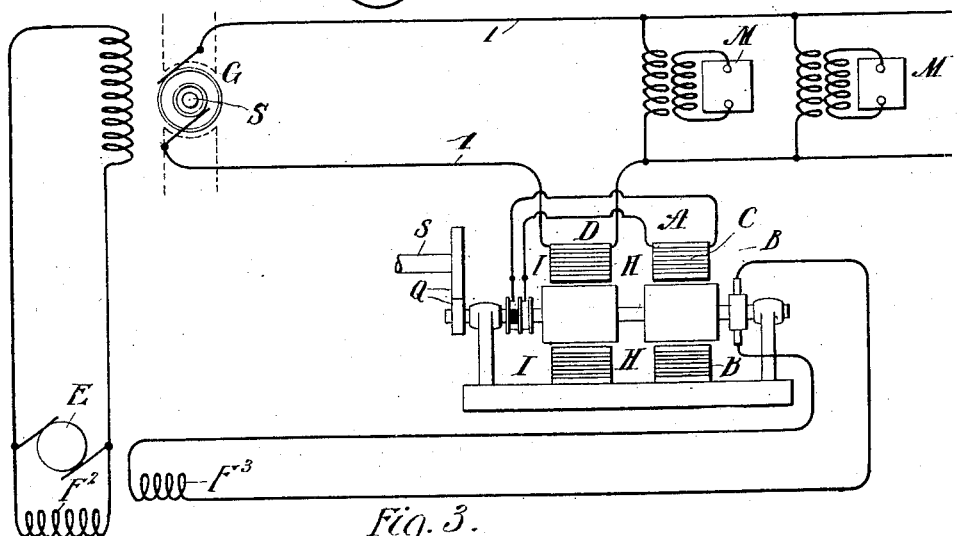

Figure 1 is a diagram of a system embodying my invention. Fig. 2 is a diagram showing the relations of electromotive forces and currents. Fig. 3 shows diagrammatically the arrangement of the structural parts.

Referring more particularly to the drawings, G is an alternating-current generator supplying motors M M.

$F'$ is the energizing-coil of the generator, supplied by an exciter, of which E is the armature, having an energizing-coil $F^2$ in shunt thereto and a second energizing-coil $F^3$, supplied with a current varying with the inductive load. This current is supplied by a direct-current generator A, whose field-magnets B B are excited by the coil C, supplied by another generator D, having field-magnets H H, which field-magnets H H are energized by the current in the mains 1 1. The generator D, as shown, has its field-magnet energized directly from the circuit 1 1, the energizing-coil I forming a part of that circuit. This generator is for purposes of explanation shown as a two-pole generator having an armature consisting of a single turn, which has its terminals $jj$ connected, respectively, to the electrically-connected segments $k\,k$ and the continuous ring $l$, upon which, respectively, bear the brushes $m\,m'$, the brushes being so arranged that when the armature-winding is in the position shown the brush $m$ shall be in the middle of one of the segments $k$.

The armature of the generator D is so related to the armature of the generator G that when the load upon the circuit 1 1 is non-inductive and the phase of the current in that circuit is zero the armature shall be in the position shown—that is, shall be in such position that the brush $m$ shall make and break contact with the segment $k$ when the electromotive force in the armature of the generator D is at a maximum. The relations of the segments $k$ to the electromotive force generated by the armature of the generator D is shown by the Diagram 2. In this diagram, O represents the current in the mains 1 1.

P represents the electromotive forces in the armature of the generator D, and $k'\,k^2$, &c., represent relative positions of the segments $k$. If the current in the main 1 represented by the line O does not lag, the relative position of the segments $k$ is represented by the line $k'$. If it does lag, the result is the same as a relative advance of the segment $k$, and its position relatively to the phase of the current O, and the electromotive forces in the armature of the generator D are represented by the portion of the line P corresponding to line $k^2$, Fig. 2. If the current lags still more, the relative position of the segment $k$ is represented by the line $k^3$, Fig. 2. If the lag is a negative lag, the relative position for an equal displacement will be shown by the line $k^4$. From this it will be seen that with a positive lag the maximum of the field of the generator A becomes greater, thereby supplying a greater current to the field-coil $F^3$ of the exciter E, that coil being so wound as to under such conditions increase the magnetism of the exciter, due to its own field-coil $F^2$. If there is no lag in the current of the main generator, there is no effective magnetism in the field of the generator A and no effect is produced thereby. If, however, there is a negative lag in the current of the main generator, the field of the generator A is so magnetized as to supply a current to the field-coil $F^3$, which will tend to reduce the magnetism due to the shunt-coil $F^2$. The system therefore compensates for both positive and negative variations in lag in the circuit of the main generator.

In the operation of the apparatus the generators G and D are run synchronously with each other—i. e., so as to have the same polar speed. The brush m selects portions of the electromotive forces generated by the generator D, as shown in the diagram Fig. 2, and impresses corresponding currents upon the field-magnets B B of the generator A, which generator generates a corresponding direct current and impresses corresponding magnetizing forces upon the field-magnet of the exciter in addition to those impressed by the exciter-coil $F^2$.

Although in the arrangement I have shown the effect of the generator A is impressed upon the exciter instead of upon the field of the main generator directly and is impressed by the use of the circuit-winding $F^3$, my invention is not necessarily confined to this arrangement, but may be embodied in various other arrangements and constructions, both as to this matter and to other particulars here shown.

In practice the generators A and D are mounted on the same shaft and geared to the shaft S of the generator G, as shown in Fig. 3, the gearing Q being such as to make the polar speeds of the armatures D and G the same.

What I claim is—

1. The combination of a main alternating-current generator, an auxiliary current-generator rotating in synchronism therewith, the field of such auxiliary generator being energized by the alternating current produced by the main generator, a direct-current generator excited by said auxiliary generator, and means for causing the direct current generated thereby to impress upon the main generator compensating magnetizing forces.

2. The combination of a main alternating-current generator, an auxiliary generator energized by the alternating current supplied by said main generator, a direct-current generator energized by said auxiliary generator, an exciter for said main generator acted upon by the current from said direct-current generator.

3. In a system of distribution the combination of a main alternating-current generator, an auxiliary generator energized by the alternating current supplied by said main generator and in synchronism with said main generator, a direct-current generator energized by said auxiliary generator, an exciter for said main generator acted upon by the current from said direct-current generator.

4. In a system of distribution the combination of a main alternating-current generator, an auxiliary generator energized by the alternating current produced by said main generator and in synchronism therewith, collecting segments on said auxiliary generator, brushes making and breaking contact therewith, a direct-current generator having its field-windings connected with said brushes, and means for causing the direct current generated thereby to impress upon the main generator compensating magnetizing forces.

5. In a system of distribution the combination of a main alternating-current generator, an auxiliary generator energized by the alternating current produced by said main generator and in synchronism therewith, collecting segments on said auxiliary generator, brushes making and breaking contact therewith, a direct-current generator having its field-windings connected with said brushes, and an exciter for said main generator acted upon by the current from said direct-current generator.

Signed at Paloalto, California, this 15th day of September, 1902.

FRANK GEORGE BAUM.

Witnesses:
ALBERT W. SMITH,
GEORGE F. MADDOCK.